United States Patent [19]
Roberts et al.

[11] Patent Number: 5,790,418
[45] Date of Patent: Aug. 4, 1998

[54] ADAPTIVE POLARIZING MEMORY VOLTAGE TIME CONSTANT

[75] Inventors: Jeffrey B. Roberts, Moscow, Id.; Daqing Hou, Pullman, Wash.

[73] Assignee: Schweitzer Engineering Laboratories, Inc., Pullman, Wash.

[21] Appl. No.: 544,274

[22] Filed: Oct. 17, 1995

[51] Int. Cl.[6] .............................................. H02H 3/26
[52] U.S. Cl. ........................... 364/492; 361/80; 361/65; 361/79
[58] Field of Search .......................... 364/492; 361/80, 361/65, 79, 83, 86, 88, 89, 93, 94, 110, 95, 96, 97, 63, 67, 70, 75, 59, 62; 324/522, 524; 307/126, 127, 130

[56] References Cited

U.S. PATENT DOCUMENTS

| | | | |
|---|---|---|---|
| 4,056,839 | 11/1977 | Andow | 361/68 |
| 4,149,210 | 4/1979 | Wilson | 361/95 |
| 4,161,011 | 7/1979 | Wilkinson | 361/80 |
| 4,329,727 | 5/1982 | Premerlani | 361/80 |
| 4,344,143 | 8/1982 | Kurosawa et al. | 364/492 |
| 4,403,268 | 9/1983 | Keeney, Jr. | 361/80 |
| 4,405,966 | 9/1983 | Cavero | 361/80 |
| 4,420,788 | 12/1983 | Wilkinson et al. | 361/85 |
| 4,420,789 | 12/1983 | Breen | 361/94 |
| 4,433,353 | 2/1984 | Wilkinson | 361/80 |
| 4,438,476 | 3/1984 | Breen | 361/96 |
| 4,453,191 | 6/1984 | Wilkinson | 361/84 |
| 4,455,612 | 6/1984 | Girgis et al. | 364/483 |
| 4,689,709 | 8/1987 | Isahaya | 361/80 |
| 4,751,604 | 6/1988 | Wilkinson | 361/68 |
| 4,819,119 | 4/1989 | Wilkinson | 361/76 |
| 4,821,137 | 4/1989 | Wilkinson | 361/80 |
| 4,825,323 | 4/1989 | Wilkinson | 361/65 |
| 4,825,327 | 4/1989 | Alexander et al. | 361/82 |
| 4,857,854 | 8/1989 | Matsushima | 324/512 |
| 4,906,937 | 3/1990 | Wikstrom et al. | 324/522 |
| 5,140,492 | 8/1992 | Schweitzer III | 361/80 |
| 5,295,035 | 3/1994 | Nishijima et al. | 361/63 |

Primary Examiner—Emanuel Todd Voeltz
Assistant Examiner—Tony M. Cole
Attorney, Agent, or Firm—Jensen & Puntigam, P.S.

[57] ABSTRACT

At least two different time constants are used to produce the polarizing memory reference voltage which in turn is used in a protective relay for power transmission lines. For most conditions, a relative short time constant of 1.75 cycles is used, while under other specific conditions, determined automatically, a longer time constant of 15.75 cycles is used.

13 Claims, 1 Drawing Sheet

ADAPTIVE POLARIZING MEMORY VOLTAGE TIME CONSTANT

TECHNICAL FIELD

This invention relates generally to protective relay apparatus for power transmission lines, which use a polarizing memory voltage as a reference voltage, and more specifically concerns the time constant which is used in generating and updating the polarizing memory voltage.

BACKGROUND OF THE INVENTION

The present invention concerns the time constant which is used by a memory filter portion of a polarizing memory voltage circuit. A polarizing memory voltage is used as a reference voltage by a protective relay for power transmission lines, in particular a distance relay, for comparison against a voltage value representative of the voltage on the transmission line to determine a possible fault on the line.

U.S. Pat. No. 5,140,492, owned by the assignee of the present invention, is directed to a protective relay apparatus for generating and using a polarizing memory voltage; the contents thereof are hereby incorporated by reference. As taught in the '492 patent, a positive sequence voltage is used to develop a positive sequence polarizing memory voltage. Positive sequence voltage refers to the combined phasor line voltages VA, VB and VC, all rotating in a positive sequence. The determination of positive sequence voltage is well known. The voltages for the three different phases VA, VB and VC on the transmission line are sampled and then filtered through a positive sequence filter to produce a positive sequence voltage VA1. This is set forth in more detail in the '492 patent.

The output of the positive sequence filter is then applied to a memory filter to produce the desired polarizing memory voltage, referred to alternatively as VA1M or VAP. In the specific memory filter arrangement set out in the '492 patent, the output of the memory filter has a time constant of approximately four cycles and the positive sequence polarizing memory voltage has a duration of approximately 20 cycles. The output of the memory filter, with the VA1 input, is used directly as a polarizing memory voltage for A phase voltage elements. Similar arrangements are used to produce polarizing memory voltages VB1M (VBP) and VC1M (VCP) for the phase B and phase C voltage elements. The operation of the memory filter results in a delay between the input and the output thereof, permitting the output to come up slowly to the value of the input voltage and then to decrease slowly when the input is no longer present.

As an example, when a non-zero input is applied to a previously steady state, zero input memory filter, the output (which is the basis for the polarizing (memory voltage) will rise to 63% of the input within the time constant of the filter, and will decrease to 37% of the maximum input within the filter time constant following decrease of the input from maximum to zero. The longer the time constant, the longer that the positive sequence polarizing memory voltage persists. As indicated briefly above, and as discussed in the '492 patent, the resulting positive sequence polarizing memory voltage is then used by the distance elements in the relay to determine the presence of an underimpedance condition (fault) on the power transmission line.

Typically, the time constant associated with existing memory filters is relatively short, covering in the range of 1 ½ to four cycles of the power signal. While advantageous in most situations, including specifically for the off-nominal frequency response of relay distance elements over certain voltage ranges, which permits the polarizing memory voltage for the distance elements to more closely follow the actual conditions of the power line system, a longer time constant does have advantages over the more conventional short time constant in certain situations.

For example, a longer time constant is desirable when there is a close-in (0-voltage), reverse, extended duration, three-phase fault. If this fault persists longer than the duration of the polarizing memory voltage, the reverse reaching phase distance element drops out when the magnitude of the polarizing voltage decreases to a voltage threshold.

Another situation in which a long time constant is desirable concerns forward reaching distance elements on electrically short power lines. For this particular situation, the three-phase voltage for remote faults can be very low when measured by the protective relay, which in turn can result in the polarizing memory voltage expiring before a time-delayed distance element timer expires. For three-phase faults in particular, all three phase voltage magnitudes become very small, and the voltages to the positive sequence memory filter are nearly zero. The polarizing memory voltage must be stable, reliable and available for the entire duration of the time required for the relay to trip. Typically, when the voltages to the positive sequence memory filter are so low that the magnitude of the polarizing memory voltage decreases to one volt, the distance elements are disabled, because the polarizing memory voltage is no longer reliable as a reference.

In another example where a long time constant is desirable, relay security is increased if the magnitude of the most recent positive sequence voltage determination is greater than 1.05 times the magnitude of the polarizing memory voltage. This particular magnitude relationship is important in series compensated power line applications where voltage inversions are possible. Voltage inversion refers to a condition where the faulted phase voltage(s) is(are) 90° or more out-of-phase with the source voltage. While a positive sequence memory voltage permits the relay to initially make a correct directional determination of a fault in such a case relative to the relay, the voltage inversion eventually will overtake the polarizing memory voltage and an incorrect directional decision might be made. The longer the time constant for the polarizing memory voltage, the longer the polarizing memory voltage can be used to provide correct directional information.

Although, as can be seen, there are several specific situations in which a long time constant is desirable, the more general advantages of a short time constant are sacrificed when a longer time constant is used.

Hence, it would be desirable to have a polarizing memory voltage which has the advantages of a more conventional short time constant, but can also provide good results in those circumstances where a long time constant would be desirable.

DISCLOSURE OF THE INVENTION

Accordingly, the present invention is an improvement useful in a relay apparatus which includes a plurality of relay element which use a polarizing memory voltage as a reference voltage to determine selected fault conditions on a power transmission line. The improvement includes means in the polarizing memory voltage generating means for selectively changing between at least two different time constants used for said polarizing memory voltage.

BRIEF DESCRIPTION OF THE DRAWINGS

The FIGURE is a circuit diagram showing the memory filter and associated logic circuitry for the polarizing memory circuit of the present invention.

BEST MODE FOR CARRYING OUT THE INVENTION

Figure 1:
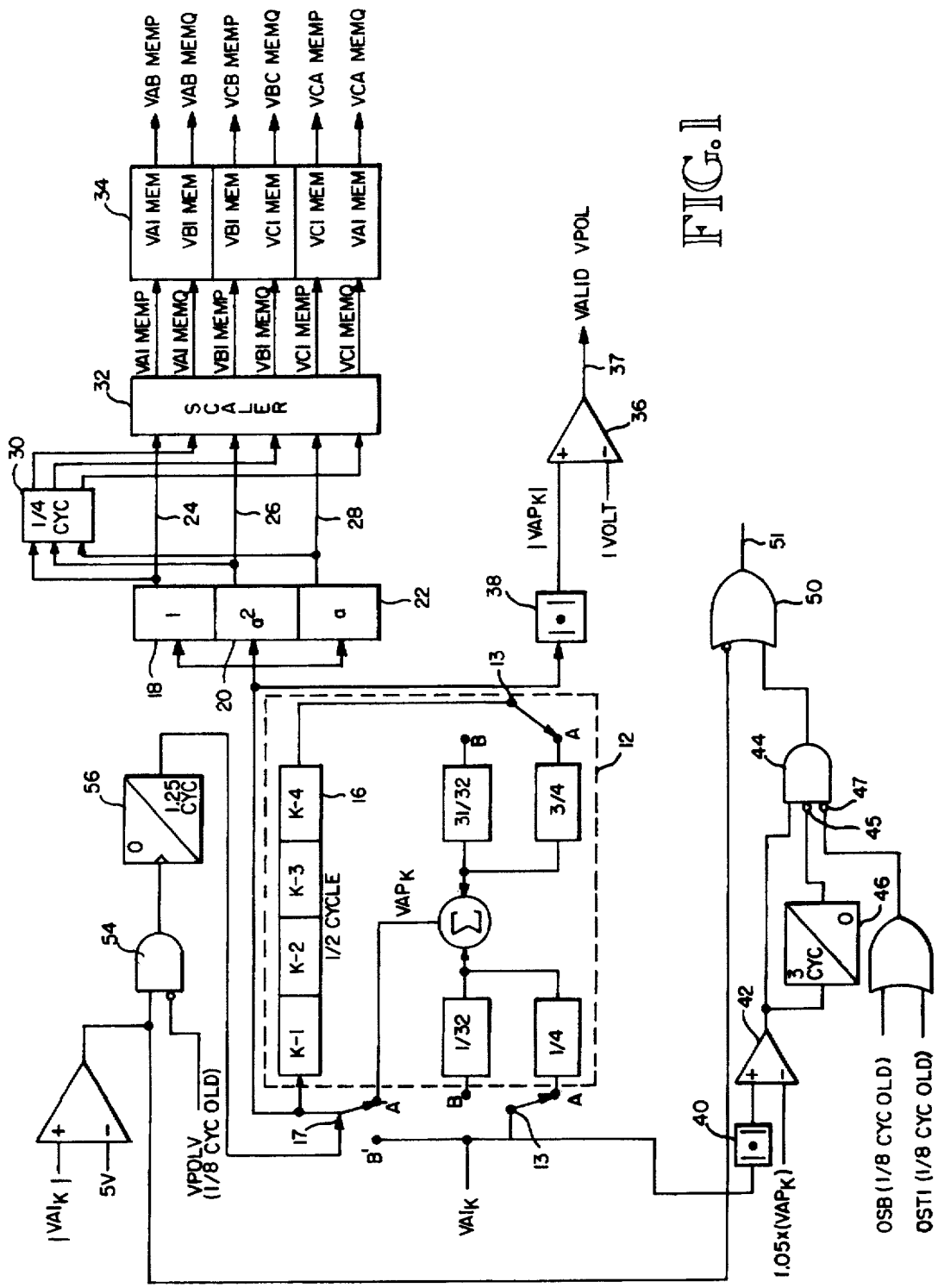

The present invention, which is shown in the FIGURE, is a circuit which uses a variable time constant (at least two different time constants) in the generation of a positive sequence polarizing memory voltage (phases A, B and C), the length of the time constant depending upon the relative percentages of the polarizing memory voltage value and the current value of positive sequence voltage used in producing the updated value of memory voltage. In the present invention, there are two specific time constants, one time constant being relatively short, which is the one used unless one of several specific pre-established conditions is met, at which point the time constant is changed to a relatively long time constant. In the present case, the short time constant is 1.75 cycles and the long time constant is 15.75 cycles of the power signal on the transmission line. With the shorter time constant, the most current value of positive sequence voltage has a greater effect on the new memory voltage value. With a longer time constant, a change in positive sequence voltage will take longer to fully impact the memory voltage value. In the embodiment shown, the positive sequence polarizing memory voltage is calculated with each new sample of positive sequence voltage, eight times per cycle of the power signal. This could also be varied. It should be understood that different time constants may be used, depending upon the particular application, and further, that more than two, i.e. multiple, time constants may be used, depending upon particular circumstances and the particular design of the circuit.

The use of two or more different time constants results in the relay apparatus becoming overall more reliable, versatile and secure relative to the determination of faults on the power transmission line which the relay is protecting. In particular, the availability of a relatively long time constant allows the relay to perform well in a number of particular circumstances where a short time constant might provide less reliable results.

Referring now specifically to the FIGURE, which shows the overall circuit for producing the polarizing memory voltages used by the distance elements in a protection relay, a memory filter 12 is shown, which is responsive to successive positive sequence voltage samples $VA1_k$ to produce a memory voltage $VAP_k$. The positive sequence voltage samples are obtained by other circuitry, as explained above, such as by a positive sequence filter. The subscript "k" refers to the current (most recent) sampled and/or determined value.

The most recent positive sequence voltage sample $VA1_k$ is applied to a double pole switch 13 in memory filter 12, switch 13 being normally in position A. In position A, one-fourth of the new, i.e. most recent, positive sequence voltage is applied to summing circuit 14. Three-quarters of the value of the polarizing memory voltage from a ½ cycle (4 samples) point back in time, which has been stored in a sequential register 16, is also applied to summing circuit 14, to produce $VAP_k$, the new memory voltage value.

In the embodiment shown, as explained above, samples of positive sequence voltage VA1 are taken 8 times per power signal cycle and hence, the determination of the positive sequence polarizing memory voltage VAP is also made 8 times per cycle. Each value of VAP is applied to register 16, which temporarily stores 4 successive values of VAP determined by the summer 14. By the time a previously determined value of VAP is ready to be used in the summing circuit, 4 sample periods (½ cycle) have gone by. The VAP values stored in register 16 thus cover one-half cycle of the voltage on the power transmission line being protected.

The output of summer 14, $VAP_k$, i.e. the most recent value of VAP, when switch 12 is its A position, is the result of a relatively short time constant, i.e. 1.75 cycles. This "short" time constant occurs when the respective contributions toward the new value of polarizing memory voltage are one quarter from the most recent value of positive sequence voltage $VA1_k$ and three-quarters from the value of the polarizing memory voltage VAP at a point in time ½ cycle (4 samples) back (previous).

The output of summer 14 is applied as an input to three phase rotation circuits 18, 20 and 22, through switch 17. The phase rotation circuit 18, designated 1, results in no phase rotation of the input signal on its output line 24. The signal applied to phase rotation device 20, designated $a^2$, has a 240° phase rotation, on output line 26. Phase rotation device 22, designated a, produces a 120° phase rotation of the input signal, on its output line 28.

The values on output lines 24, 26 and 28 are then applied simultaneously to a one-quarter cycle delay circuit 30 and to a scaler device 32. The scaler 32 reduces the values applied to it by a preselected amount.

The output of the scaler 32 is a pair of voltages for each phase, one voltage being a scaled polarizing memory voltage, for example $VA1_{memp}$ for A phase and the other being a quadrature signal which is 90° delayed, for example $VA1_{memq}$. The VB1 values are phase rotated 240° and the VC1 values are phase rotated 120°. The pairs of voltages from scaler 32 are then applied to a subtracter unit 34 in which the polarizing memory voltage VB1 is subtracted from VA1. Similarly VC1 is subtracted from VB1 and VA1 is subtracted from VC1. The output of the subtracter unit 34 is thus $VAB_{memp}$, $VBC_{memp}$, $VCA_{memp}$ and their quadrature values. These polarizing memory voltages are then applied to the distance elements in the relay for phase-to-phase comparison with sampled voltages of the three phases of the power signal on the power transmission line, such as set forth in the '492 patent.

The following explanation concerns the various specific conditions in the embodiment shown under which the memory filter 12 will use a long time constant of 15.75 cycles. When that occurs, switch 13 will move from position A to position B, wherein the most recent sample of positive sequence voltage $VA1_k$ contributes ¹⁄₃₂ to the new polarizing memory voltage, while the ½ cycle previous polarizing memory voltage contributes ³¹⁄₃₂ of the new value. As indicated above, if switch 13 is not in the long time constant position (position B) as determined by the occurrence of specified conditions, switch 13 remains in position A, which results in the short time constant being used, i.e. it in effect defaults to position A in the absence of the specified conditions.

Some of the conditions for using a long time constant require that it be known whether or not the polarizing memory voltage is large enough to be valid. Hence, the output $VAP_k$ of memory filter 12 (for phase A) is applied to an absolute magnitude determination circuit 38, which uses a quadrature value of $VAP_k$ to determine the absolute magnitude value. This absolute value of polarizing memory voltage is then compared against a threshold of one volt by comparator 36. If the absolute value is greater than one volt, the polarizing memory voltage is deemed to be valid and a bit is asserted on the output line 37 of comparator 36. However, if the polarizing memory voltage is less than one volt, which is considered to be insufficient, many of the distance elements in the relay are disabled.

The most recently determined value of positive sequence voltage, besides being applied to memory filter 13, through switch 12, is also applied to an absolute magnitude determination circuit 40 which uses a quadrature signal to determine the absolute magnitude value. This value is compared to a value of $1.05 \times VAP_k$, which as indicated above is the most recent value of polarizing memory voltage, i.e. the most recent output of summing circuit 14. A "true" or "high" output of comparator 42 is indicative of a voltage inversion, which is one condition in which a longer time constant is helpful. The output of comparator 42 is applied as an input to AND gate 44 and is also applied to a three-cycle timer 46. When the output of comparator 42 is true (high), the output of the timer 46 remains low (0) for a time equal to three cycles of the power signal. A low output from timer 46 will produce a high at the NOT input 45 to AND gate 44. Hence, for three cycles following a high output from comparator 42, there will be "high" inputs to AND gate 44 from comparator 42 and timer 46. Lastly, if neither an out-of-step (OSB) blocking condition or an OSTI (out-of-step trip) condition (from ⅛ cycle back in time) have been recognized (OSB and OSTI are common, well-known signal determinations made in protective relays and are well understood by one skilled in the art), the output from OR gate 48 will be low, which in turn will produce a high at NOT input 47 to AND gate 44.

All of the inputs will thus be high to AND gate 44 for the above-described conditions (for a total of 3 cycles) so that the output of AND gate 44 will be high for that time period to OR gate 50, resulting in a "high" at the output 51 thereof. The "high" or "one" logic output from OR gate 50 is then applied to switch 13 in the memory filter, changing it to the B position, which results in the generation of memory voltage values using the long time constant of 15.75 cycles.

When the three cycles (24 samples) timer 46 times out, the output of AND gate 44 will again go low (0) and the output of OR gate will also go low (0), the output of OR gate 50 will also go low, and switch 13 will then change back to position A, with the short time constant of 1.75 cycles again being used. Three cycles is usually sufficient time to eliminate the effect of a voltage inversion. It should be recognized, however, that an out-of-step blocking condition or out-of-step trip condition indication will prevent the output of AND gate 44 from going high, and the voltage comparison carried out by comparator 42 will have no effect (the time constant will be short).

Another condition under which OR gate 50 will produce a high output so as to make the memory filter go to a long time constant involves the comparison of the most recent positive sequence voltage value (absolute value thereof) with 5 volts. If the positive sequence voltage is less than 5 volts, the output of comparator 52 is low, which results in a high at the NOT input to OR gate 50, which again results in a high output of OR gate 50 and a resulting change in switch 13 to position B (long time constant).

The output of comparator 52 is also applied as one input to AND gate 54. At the other input, which is a NOT, is the output from comparator 36, a valid polarizing memory voltage indication ($V_{POLV}$). If the polarizing memory voltage is valid, a bit output is asserted, the NOT input to AND gate 54 will be low and the output of gate 54 will thus be low. However, if the polarizing memory voltage had been recently (⅛ cycle back) determined to be invalid (i.e. below one volt), then during that time (the time the memory voltage is invalid) the NOT input to AND gate 54 is high.

Concurrently, if the most recent positive sequence voltage is above 5 volts, the output of AND gate 54 will go high, the leading edge of which will start the 1.25 cycle timer 56 output to go high. The output of timer 56 will be high for the next 1.25 cycles, the amount of time for 10 successive samples in the embodiment shown. The high output of timer 56 will change switch 17 to position $B^1$, which in effect cuts out filter 12. The most recent positive sequence voltage $VA1_k$ will be applied directly to the phase rotation devices and also to register 16, where it will cycle through, sample by sample. This arrangement in effect "fast charges" memory filter 12 and register 16 for the total of 1.25 cycles. At the end of 1.25 cycles, the output of the timer 56 will change back to low (0), switch 17 will return to position $A^1$ and the memory filter 12 will again operate as described above.

As can be seen from the above, the circuit of FIG. 1 includes a memory filter which typically uses a relatively short time constant for the polarizing memory voltage, which is developed from positive sequence voltage. However, for a number of specialized system conditions, which are recognized by various other portions of the circuit, a relatively long time constant is used. Further, certain other conditions, such as minimum values of memory voltage, for reliability and fast charging of the memory filter, occur under other conditions. As indicated above, having more than one polarizing memory voltage results in a protective relay which is more secure, more versatile and overcomes some of the inherent disadvantages of previous relays which use a single time constant.

Although a preferred embodiment of the invention has been disclosed herein for illustration, it will be understood that various changes, modifications and substitutions may be incorporated in such embodiment without departing from the spirit of the invention which is defined by the claims which follow.

What is claimed is:

1. In a protective relay apparatus which includes a plurality of relay elements which use a polarizing memory voltage, produced by polarizing voltage generating means, as a reference voltage against which a value representative of a voltage on a power transmission line is compared to determine selected fault conditions on the power transmission line, wherein the polarizing memory voltage is produced from positive sequence voltage and changes as the positive sequence voltage changes, the improvement comprising:

means in the polarizing memory voltage generating means for automatically changing, during operation of the apparatus, between at least two different time constants used for said polarizing memory voltage, in accordance with preselected criteria.

2. An apparatus of claim 1, wherein one time constant is relatively short and another time constant is considerably longer.

3. An apparatus of claim 2, wherein the one time constant is approximately 1.75 cycles and the other time constant is approximately 15.75 cycles.

4. An apparatus of claim 2, wherein positive sequence voltage is used to produce the polarizing memory voltage and in the event the positive sequence voltage is smaller than approximately 5 volts, the longer time constant is used.

5. An apparatus of claim 2, wherein when a most recent positive sequence voltage value is greater than 1.05 times an immediate past polarizing memory voltage, the longer time constant is selected.

6. An apparatus of claim 5, wherein the longer time constant is only used for approximately 3 cycles.

7. An apparatus of claim 1, including means for determining if the polarizing memory voltage has at least a minimum preselected magnitude and means for disabling certain of the relay elements if the polarizing memory voltage is not at said minimum magnitude.

8. An apparatus of claim 7, wherein when the last previous sample of polarizing memory voltage is invalid, the occurrence of a most recent positive sequence voltage value greater than 5 volts results in said positive sequence voltage value and successive values thereof being solely used to produce new polarizing memory voltage values for a selected period of time.

9. An apparatus of claim 1, wherein the polarizing memory voltage generating means includes a memory filter which produces a memory voltage from the most recent positive sequence voltage and previous values of polarizing memory voltage, and wherein said automatic means includes means for changing between different ratios of positive sequence voltage and previous values of polarizing memory voltage to provide the different time constants.

10. An apparatus of claim 9, where said preselected criteria depend upon the magnitude of the positive sequence voltage and the magnitude of the polarizing memory voltage.

11. A relay apparatus for protection of power transmission lines, comprising:

means for producing a polarizing memory voltage from a positive sequence voltage, the polarizing memory voltage being used as a reference voltage against which a value representative of a voltage on a power transmission line is compared by relay elements to determine selected fault conditions on the power transmission line, wherein the polarizing memory voltage is produced from positive sequence voltage and changes as the positive sequence voltage changes, and wherein the producing means includes a memory filter which uses a time constant for the polarizing memory voltage; and means for automatically changing, during operation of the apparatus, between at least two different time constants in the memory filter, in accordance with preselected criteria.

12. An apparatus of claim 11, wherein one time constant is relatively short and the other time constant is considerably longer.

13. An apparatus of claim 12, wherein the one time constant is approximately 1.75 cycles and the other time constant is approximately 15.75 cycles.

\* \* \* \* \*